Nov. 10, 1925.
W. E. MENZIES
REGULATOR SYSTEM
Filed June 14, 1923
1,561,268
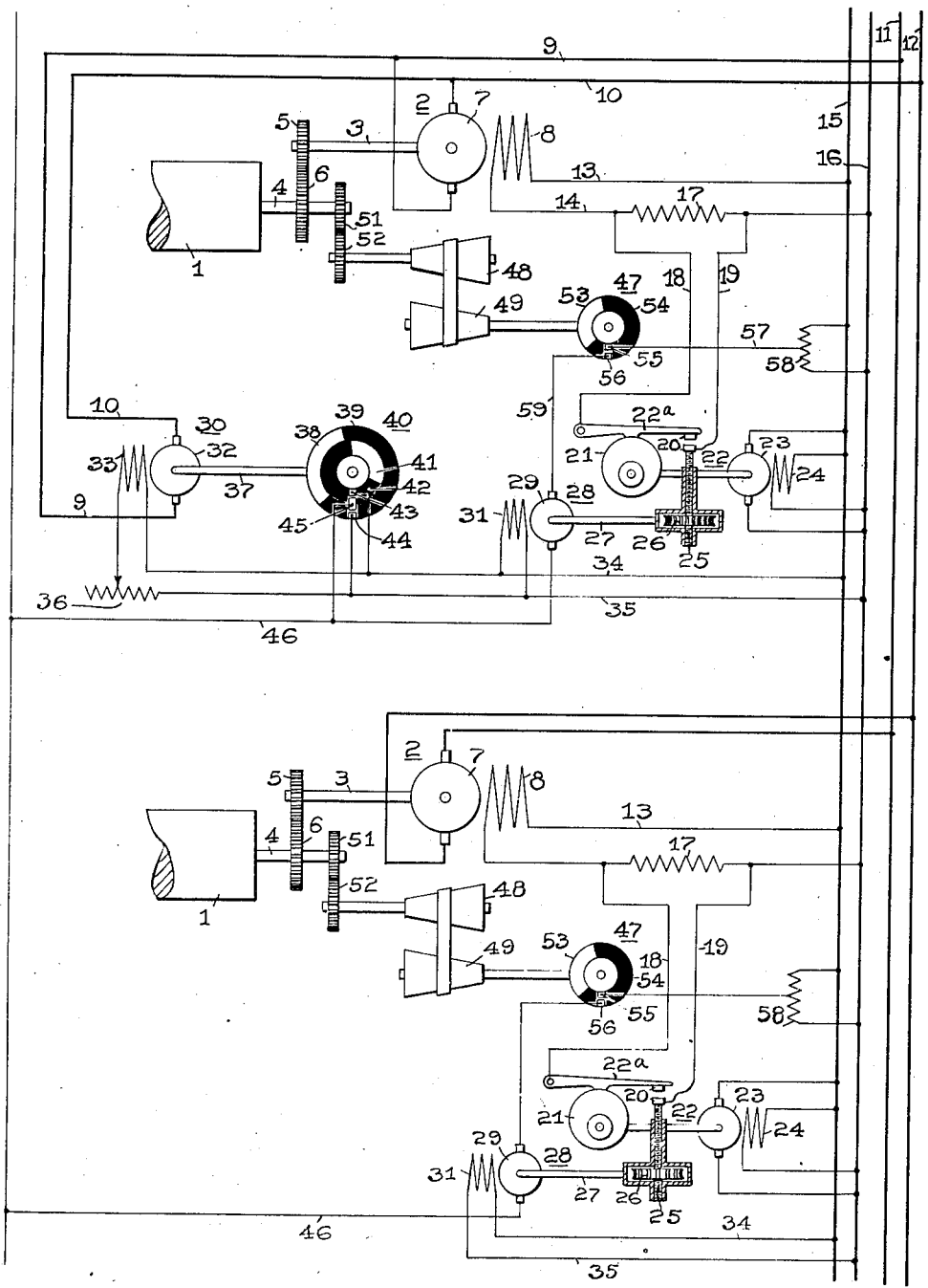
WITNESSES:
INVENTOR
William E. Menzies
BY
Wesley G. Carr
ATTORNEY Patented Nov. 10, 1925.

1,561,268

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed June 14, 1923. Serial No. 645,276.

*To all whom it may concern:*

Be it known that I, WILLIAM E. MENZIES, a citizen of the United States, and a resident of Irwin, in the county of Westmoreland and State of Pennsylvania, have invented a new and useful Improvement in Regulator Systems, of which the following is a specification.

My invention relates to regulator systems and more particularly to regulator systems for maintaining a number of machines at definite relative speeds that are variable at will.

One object of my invention is to provide a regulator system that shall govern the speeds of a number of motors and that shall maintain a substantially constant speed ratio between them.

Another object of my invention is to provide a regulator system of the above-indicated character in which the amount of correction upon each motor is directly proportional to its angular displacement from normal with respect to a master speed-reference means.

A still further object is to provide a system of the class under consideration in which a convenient interval of the time is introduced between the periods of correction to prevent over-travel of the speed-correcting means and thus prevent hunting action of the controlled motor.

In many industrial applications, it is desirable to operate a number of rotating members at a constant speed or to maintain a constant speed ratio between a member of moving parts; thus, in the case of paper-making machines it is necessary that the speed ratio between various sets of paper rolls be maintained constant in order to prevent breaking the paper.

If a regulator system constructed in accordance with my invention is applied to a paper-making machine, each set of paper rolls is individually motor driven and the various motors are so controlled as to maintain a substantially constant speed ratio between them. Means are provided whereby the ratio between the various rolls may be varied at will.

In the accompanying drawing, the single figure is a diagrammatic view of a system of control organized in accordance with my invention for maintaining a plurality of machines at definite relative speeds and at the same time affording a convenient means for varying the speed relation.

Referring to the accompanying drawing, a papermaking machine is shown as provided with a plurality of sets of rolls 1, only two such rolls being illustrated for the sake of simplicity. The several sets of rolls, or sections of the apparatus, being similar, only one set will be described. Rolls 1 are driven by a main direct-current motor 2, by means of shafts 3 and 4 and co-operating gear-wheels 5 and 6. Main or section motor 2 comprises an armature 7 and a field winding 8. The armature 7 is connected by means of conductors 9 and 10 to variable-voltage supply conductors or bus bars 11 and 12. The field winding 8 is connected by means of conductors 13 and 14 and a resistor 17 to constant-voltage supply conductors or bus bars 15 and 16.

Extending from the terminals of the resistor 17, conductors 18 and 19, together with co-operating contact members 20, provide means for short-circuiting the resistor. The contact members 20 are intermittently brought together and separated by means of a lever 22ª. This lever is actuated by an eccentrically mounted cam 21, which is rotated at constant speed by motor 22. The motor 22 comprises an armature 23 and a field winding 24, each being connected to the constant-potential bus bars 15 and 16.

The lower contact member 20 is mounted upon a screw-threaded shaft 25, which is actuated by a worm gear 26 by means of a worm shaft 27 that is driven by motor 28. The pilot motor 28 comprises an armature 29 and field winding 31. The field winding 31 is connected by means of conductors 34 and 35 to constant-voltage bus bars 15 and 16.

A motor 30, which may be termed a master motor, is connected by means of conductors 9 and 10 to variable-potential bus bars 11 and 12. The field winding 33 of the motor 30 is connected by means of conductors 34 and 35 to constant-potential bus bars 15 and 16. A variable resistor 36 is provided in the field circuit. The master motor 30 drives a master commutator 40 by means of shaft 37.

The commutator 40 is provided with two concentrically or otherwise related portions or rings, one of said portions having a conducting segment 41 and a non-conducting segment 42, the other having a conducting segment 38 and a non-conducting segment 39.

A brush 43 that is connected to conductor 34 is adapted to engage the conducting segment 41 and the non-conducting segment 42. A brush 44 that is connected to conductor 35 is adapted to engage the conducting segment 38 and the non-conducting segment 39. An intermediate brush 45 is adapted to simultaneously engage certain pairs of the concentrically related conducting and non-conducting segments, as illustrated. The conducting segments 38 and 41 extend over substantially one-third of the operative cycle of the commutator and are so positioned that the brush 45 engages one of these conducting segments for substantially one-third of said operative cycle, then the other segment for substantially one-third of the operative cycle, and then simultaneously two non-conducting segments for substantially one-third of the operative cycle. Brush 45 is connected to a conductor 46, which is connected to one side of the armature of pilot motor 28.

A commutator 47 is connected by means of cone pulleys 48 and 49 and co-operating gear-wheels 51 and 52 to the paper roll 1. The commutator 47 comprises a conducting segment 53, extending for substantially one-third of the operative cycle of the commutator, and non-conducting segment 54, extending over the remaining portion of the commutator. A brush 55 engages the commutator segments and is connected by means of conductor 57 to the mid-point of a ballast resistor 58, which is connected across the constant-potential bus bars 15 and 16. A brush 56 also engages the commutator 47 and is connected by conductor 59 to the side of the armature of pilot motor 28 opposite to that connected to brush 45 of master commutator 40.

It will be seen by a study of the apparatus disclosed that, upon the intermittent short-circuit of the resistor 17 through contact members 20, the effective field excitation of main motor 2 will be modified and also that, as the proportion of time during which the short-circuit is maintained is varied, the strength of the field current will be likewise varied. As the pilot motor 28 operates the worm gear 26, in the one or the other direction, the shaft 25 will be raised or lowered. The upper contact member 20 is raised at regular intervals by means of the cam 21 and the lever 22. It will be seen, therefore, that the higher the lower contact member 20 is located the shorter will be the interval of time during which the upper contact member 20 will be raised and the short-circuit of the resistor 17 broken. Instead of the single pair of contact members 20, several pairs of contact members might be used, each pair short-circuiting a portion only of the resistor 17, and being jointly actuated. The burning of the contact members would in this way be reduced. Also the several contact arms 22$^a$ controlling the several section motors 2 might be operated by a single cam, or by separate cams on a single cam shaft.

During the normal speed relation of the motor 2 of the master motor 30, the conducting segment 53 of the commutator 47 will pass under the brushes 55 and 56 during the same period in which brushes 43, 44 and 45 of the commutator 40 are jointly engaging the non-conducting segments 42 and 39 of the commutator 40. Under these conditions, no current will flow through the conductors 46 and 59 and the armature of the pilot motor 28.

When, however, the phase relation or relative angular position of the commutator 47 varies with respect to the master commutator 40, so that the conducting segments 53 engages brushes 55 and 56 during a period when one of the conducting segments of commutator 40 connects the brush 45 with one of the brushes 43 or 44, current will be caused to flow through the conductors 46, 59 and pilot motor 28. The length of time during which the current will flow will depend upon the degree of displacement in phase relation between the commutators 40 and 47, while the direction of flow will depend upon whether conductor 46 is connected to the conducting segment 41 or to the conducting segment 38 of the master commutator 40.

The direction of current flow through the conductors 46, 59 and the pilot motor armature 28 determines the direction of rotation of the pilot motor. If the main motor 2 tends to increase its speed above normal, the phase relation between commutators 47 and 40 thereby established will be such as to operate the pilot motor 28 so as to raise the lower contact member 20 and thus increase the period during which the resistor 17 is short-circuited, to thereby strengthen the main motor field and reduce the main motor speed. In the same way, if the main motor 2 tends to fall below normal speed with respect to the master motor 30, the circuit established by reason of the phase relation between commutators 47 and 40, will be such as to cause the pilot motor to regulate the contact members 20 so as to increase the speed of main motor 2.

It will be seen that the flow of current through the armature of pilot motor 28 will be continually interrupted, thus producing a step-by-step action of the motor while preventing an overtravel thereof. It will also be seen that the proportion of the time during which current will be maintained through the pilot motor 28 will depend upon the phase displacement between the commutators 47 and 40. Thus the corrective influence of the apparatus will depend upon the degree of departure from normal speed of the main motor 2. The disclosure illustrates two sets of regulating apparatus. Obviously any number of sets of apparatus may be regulated using only one master commutator.

The above-described structural details are diagrammatically shown, serving only to illustrate the principle of operation of the system. Various modifications in the system and in the arrangement and location of parts may be made within the spirit and scope of my invention and such modifications are intended to be covered by the appended claims.

I claim as my invention:

1. In a regulator system, the combination comprising a motor having a field winding, a resistor in circuit with said field winding, means for intermittently short-circuiting said resistor, said means comprising cam-operated contact members, electroresponsive means for varying the position of one of said contact members, and means for intermittently actuating said electroresponsive means in accordance with the speed variations of said motor.

2. In a regulator system, the combination comprising a motor to be regulated having a field winding, a resistor in circuit with said field winding, contact means for intermittently short-circuiting said resistor at regular intervals, and means for varying the duration of said short-circuits to control the effective value of said resistor, said means comprising a master commutator, a commutator actuated in accordance with the speed of said motor, and a pilot motor actuated in accordance with the phase displacement between said commutators for varying the position of one of said contact members.

3. In a regulator system, the combination comprising a motor having a field winding, a resistor in circuit with said field winding, cam-operated contact means for intermittently short-circuiting said resistor, and electroresponsive means for variably adjusting said contact means to control the effective value of said resistor and means for intermittently actuating said electroresponsive means in accordance with the speed variations of said motor.

4. In a regulator system, the combination comprising a master speed reference means, a motor having a field winding, a resistor in circuit with said field winding, cam-operated contact means for intermittently short-circuiting said resistor, and means actuated in accordance with a change in the motor speed from its normal relation to the speed of said master speed-reference means for varying the adjustment of said contact means to control the effective value of said resistor.

5. In a regulator system, the combination comprising a master speed reference means, a motor having a field winding, a resistor in circuit with said field winding, contact means for intermittently short-circuiting said resistor, and means actuated in accordance with a change in the motor speed from its normal relation to the speed of said master speed-reference means for causing a step-by-step adjustment of said contact means to control the effective value of said resistor.

6. In a regulator system, the combination comprising a speed reference means and a motor having a field winding, a resistor in circuit with said motor field winding, means for intermittently short-circuiting said resistor to control the effective value thereof comprising a pair of contact members, a master commutator actuated in accordance with the speed of said reference means, a commutator actuated in accordance with the speed of said motor, and means actuated in accordance with the phase displacement between said commutators for varying the position of one of said contact members.

7. In a regulator system, the combination comprising a master motor and a section motor, a plurality of commutators respectively actuated in accordance with the speed of said motors, said section motor having a field circuit including a resistor, cam-operated electrical contact members for intermittently short-circuiting said resistor, and adjusting means for said contact members actuated in accordance with the phase displacement between said commutators.

8. In a regulator system, the combination comprising a motor to be regulated having a field winding, a resistor in circuit with said field winding, contact means for intermittently short-circuiting said resistor at regular intervals, and means for varying the duration of said short-circuits to control the effective value of said resistor, comprising a pilot motor and means for operating said pilot motor in accordance with speed variations of said motor to be regulated.

9. In a regulator system, the combination comprising a master speed-reference means, a motor having a field winding, a resistor in circuit with said field winding, contact means for intermittently short-circuiting said resistor at regular intervals, and means cooperatively actuated by said speed-reference means and by said motor for varying the duration of said short-circuits to control the effective value of said resistor.

In testimony whereof, I have hereunto subscribed my name this 6th day of June 1923.

WILLIAM E. MENZIES.